UNITED STATES PATENT OFFICE.

FELIX von OEFELE, OF NEW YORK, N. Y.

COMPOUND OF VANADIUM AND SELENIUM.

1,154,949.      Specification of Letters Patent.      Patented Sept. 28, 1915.

No Drawing.      Application filed May 20, 1913. Serial No. 768,794.

*To all whom it may concern:*

Be it known that I, FELIX VON OEFELE, a subject of the King of Bavaria, residing in the city, county, and State of New York, have invented new and useful Improvements in Compounds of Vanadium and Selenium, of which the following is a specification.

It was known heretofore to combine oxidized vanadium compounds with oxidized selenium compounds; the products resulting from such combination contain oxygen between the atoms of vanadium and selenium and are known as selenites of vanadium-oxids and their double salts with sodium, potassium or ammonium. From the chemical formulas it is seen that these compositions contain the oxidized vanadium as bases of the salts replacing one atom of hydrogen of selenious acid according to the formula

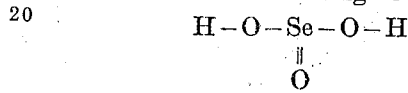

One example vanadyl-selenite:

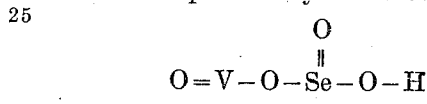

One oxygen atom in this case stays between the atoms of vanadium and selenium *i. e.* forms a link between the atoms of vanadium and selenium.

The main object of my invention is to reduce compound bodies of vanadium compounds and selenium compounds so that no intermediate oxygen stays between the atoms of vanadium and selenium whereby new compound bodies of selenium and vanadium or selenium and vanadium with basic elements such example as potassium selenovanadites, potassium selenovanadates, sodium, or ammonium or lithium selenovanadites or selenovanadates are obtained.

The method of reducing is as follows: I combine oxidized vanadium compounds such as $V_2O$ vanadium monoxid, $V_2O_2$ vanadium dioxid, $V_2O_3$, vanadium trioxid, $V_2O_4$ vanadiumtetroxid, $V_2O_5$ vanadium pentoxid with oxidized selenium compounds as for example $SeO_2$ selenium dioxid, or mixture of selenium and nitric acid $(Se+HNO_3)$ with the value of extemporaneous seleniumdioxid and seleniumtrioxid in the usual way and expose the compound bodies to heat with or without the aid of other chemical reducing agents as for example carbon compounds, sulfurous acid, or hydrochloric acid. It is essential to continue the application of heat until the reduction is completed.

The products obtained by this method of reducing combined bodies of vanadium compounds and selenium compounds are chemical compounds of vanadium and selenium, or, of vanadium and selenium with other elements in which vanadium and selenium are combined in such a way that no intermediate oxygen stays between their atoms. They represent the following complete group of compounds having definite chemical composition and are vanadium selenids as for example: $V_2Se$ white vanadium selenid, $V_2Se_2$ yellow vanadium selenid, $V_2Se_3$ red-vanadium selenid, $V_2Se_4$ dark blue vanadium selenid, $V_2Se_5$ green vanadium selenid, $V_2Se_8$ vanadium-per-selenid; and derivatives of selenids as for example $KSeVO_2$ potassium seleno-vanadate, a salt of the hypothetic acid $(VO_2)SeH$, further all vanadates and vanadites in which one atom of oxygen is replaced by selenium as is the case of alkali and earthy compounds or white crystalline salts for example $KSeVO$ potassium seleno-vanadite.

I wish to state that if any oxygen is found present in the above enumerated compounds that it will never be a link between vanadium and selenium, that it has only chemical affinity to vanadium and therefore is not exchangeable between selenium and vanadium by any process.

Compounds of this class are directly soluble in the liquids of living beings or form soluble compounds when introduced into the body of a living being.

Having now fully described my invention I claim:

A chemical compound formed of vanadium and selenium, the atoms of which are in direct combination, without intervening oxygen atoms, said compound having the property of being directly soluble in the liquids of animate beings.

FELIX von OEFELE.

Witnesses:
    EDWIN C. STEINACH,
    W. JOSEPH SICKLER.